(12) United States Patent
Kumar

(10) Patent No.: US 11,531,943 B1
(45) Date of Patent: Dec. 20, 2022

(54) INTELLIGENCE DRIVEN METHOD AND SYSTEM FOR MULTI-FACTOR OPTIMIZATION OF SCHEDULES AND RESOURCE RECOMMENDATIONS FOR SMART CONSTRUCTION

(71) Applicant: Slate Technologies Inc., Pleasanton, CA (US)

(72) Inventor: Senthil Manickavasgam Kumar, Dublin, CA (US)

(73) Assignee: Slate Technologies Inc., Pleasanton, CA (US)

(*) Notice: Subject to any disclaimer, the term of this patent is extended or adjusted under 35 U.S.C. 154(b) by 0 days.

(21) Appl. No.: 17/683,858

(22) Filed: Mar. 1, 2022

Related U.S. Application Data

(60) Provisional application No. 63/280,881, filed on Nov. 18, 2021.

(51) Int. Cl.
  *G06Q 10/06* (2012.01)
  *G06N 20/20* (2019.01)
  (Continued)

(52) U.S. Cl.
  CPC ..... *G06Q 10/06312* (2013.01); *G06K 9/6262* (2013.01); *G06N 20/20* (2019.01); *G06Q 10/0633* (2013.01); *G06Q 10/103* (2013.01)

(58) Field of Classification Search
  CPC ............... G06Q 10/0635; G06Q 50/08; G06Q 10/063116; G06Q 10/06311; G06F 16/24565
  (Continued)

(56) References Cited

U.S. PATENT DOCUMENTS 7,113,915 B1* 9/2006 Montemayor ......... G06Q 10/06
                                                705/7.13
8,260,648 B2   9/2012 Elazouni et al.
(Continued)

OTHER PUBLICATIONS

Jun Yang, Man-Woo Park, Patricio A. Vela, Mani Golparvar-Fard, Construction performance monitoring via still images, time-lapse photos, and video streams: Now, tomorrow, and the future, Advanced Engineering Informatics, vol. 29, Issue 2, 2015, pp. 211-224, ISSN 1474-0346. (Year: 2015).*

(Continued)

*Primary Examiner* — Rutao Wu
*Assistant Examiner* — Letoria G Knight
(74) *Attorney, Agent, or Firm* — Haverstock & Owens, A Law Corporation

(57) ABSTRACT

Techniques to generate a digitally optimized schedule for a construction activity to meet a construction objective(s) of a construction project are disclosed. An artificial intelligence system receives a plurality of input data sets that impact the construction project. Each of the plurality of input data sets is processed to achieve the construction objective(s). The artificial intelligence system processes the plurality of input data sets using a respective ensemble of machine learning models. The artificial intelligence system generates machine learning validated intermediate output data sets corresponding to each of the plurality of input data sets. The artificial intelligence system implements a supervisory machine learning model to generate an optimized schedule for the construction activity based on the machine learning validated intermediate output data sets and the construction objective(s).

20 Claims, 7 Drawing Sheets

(51) Int. Cl.
*G06K 9/62* (2022.01)
*G06Q 10/10* (2012.01)

(58) Field of Classification Search
USPC .................. 705/7.13, 7.23, 7.11, 7.22, 7.24
See application file for complete search history.

(56) References Cited

U.S. PATENT DOCUMENTS

| | | | | |
|---|---|---|---|---|
| 8,775,229 | B1* | 7/2014 | Danskin | G06Q 10/06312 |
| | | | | 705/7.22 |
| 10,572,848 | B2* | 2/2020 | Sen | G06T 11/206 |
| 10,846,640 | B2 | 11/2020 | Goel et al. | |
| 11,017,335 | B1* | 5/2021 | Ponce de Leon | |
| | | | | G06Q 10/063116 |
| 11,263,557 | B2* | 3/2022 | Yellin | G06Q 10/087 |
| 11,381,726 | B2* | 7/2022 | Zass | G06Q 10/06315 |
| 2008/0313110 | A1* | 12/2008 | Kreamer | G06Q 10/1097 |
| | | | | 706/14 |
| 2014/0122143 | A1* | 5/2014 | Fletcher | G06Q 10/0631 |
| | | | | 705/7.14 |
| 2019/0138667 | A1 | 5/2019 | Benesh et al. | |
| 2019/0286985 | A1* | 9/2019 | Hirvijärvi | G06N 20/00 |
| 2021/0081859 | A1* | 3/2021 | Goel | G06N 20/00 |

OTHER PUBLICATIONS

Venkatasubramanian, Karthik, "Using AL and Machine Learning to Predict Construction Schedule Delays", Oracle Construction and Engineering Blog, Jul. 1, 2021, pp. 1-5.

Fitzsimmons, John et al., "Improving Construction Project Schedules Before Execution", 37th International Symposium on Automation and Robotics in Construction (ISARC 2020), pp. 1-8.

* cited by examiner

INTELLIGENCE DRIVEN METHOD AND SYSTEM FOR MULTI-FACTOR OPTIMIZATION OF SCHEDULES AND RESOURCE RECOMMENDATIONS FOR SMART CONSTRUCTION

BENEFIT CLAIM

This application claims the benefit under 35 U.S.C. § 119(e) of provisional application 63/280,881, titled "Method and System for Multi-Factor Optimization of Schedules and Resource Recommendations for Smart Construction Utilizing Human and Machine Cognition," filed Nov. 18, 2021, the entire contents of which is hereby incorporated by reference for all purposes as if fully set forth herein.

TECHNICAL FIELD

One technical field of the present disclosure is artificial intelligence and machine learning. The disclosure relates, in particular, to use of machine learning to optimize schedule, resource allocation and work sequencing for Architecture, Engineering, and Construction (AEC) planning and execution. The disclosure also relates to optimized resource allocation, schedule generation and management for AEC using a combination of machine learning intelligence, cognition, self-learning, and trainable systems and methods.

BACKGROUND

Architecture, Engineering, and Construction (AEC) planning uses multiple processes and implementations including the generation and management of representations of a part or whole of construction designs, associated works, and allocation and management of human and material resources. It involves the creation of a digital twin of a construction design and simulation of various aspects of the construction project, such as a construction schedule, including work packs, work orders, sequence and timing of materials needed, procurement schedule, timing and source for procurement, etc. Other factors including labor, duration, dependence on ecosystem factors, topology of the construction area, weather patterns, and surrounding traffic are also taken into consideration. Furthermore, cost parameters, timelines, understanding and adherence to regulatory processes, environmental factors, and the like, play an important role in AEC planning. AEC software spans the whole design concept-to-execution phase of construction projects and includes post-construction activities as well. Such AEC software is used by organizations and individuals who are responsible for building, operating, and maintaining diverse physical infrastructures, from waterways to highways and ports, to houses, apartments, schools, shops, office spaces, factories, commercial buildings, and the like.

AEC software is needed for every step of the process, from planning to design to construction. By using AEC software, users can understand the relationships between buildings, building materials, and other systems in a variety of situations and attempt to account for them in their decision-making processes. However, current AEC software is an isolated framework and, when confronted with a multitude of input factors, from local to global events, are unable to adapt or make decisions in real time or near real time to account for the dynamic nature of a construction project.

Typical systems in the AEC field rely on manual and rule-based approaches for generating specific scenario-based outcomes. However, these systems fail to comprehend inputs or dynamic variations and may fail to provide any meaningful insights or action guidance. In addition, there is no action follow-up and validation of whether the guidance was beneficial.

This problem is exacerbated in the AEC field as factors that impact the construction schedule are many and varied, that, while known, are near impractical to predict, plan and accommodate until the factors come to pass or are likely to come to pass with some degree of certainty.

Accordingly, there is a need for technical solutions that address the needs described above, as well as other inefficiencies of the state of the art.

SUMMARY

The following represents a summary of some embodiments of the present disclosure to provide a basic understanding of various aspects of the disclosed herein. This summary is not an extensive overview of the present disclosure. It is not intended to identify key or critical elements of the present disclosure or to delineate the scope of the present disclosure. Its sole purpose is to present some embodiments of the present disclosure in a simplified form as a prelude to the more detailed description that is presented below.

In an example embodiment, an artificial intelligence system provides and dynamically implements a digital imprint for optimized schedule and resource allocation for activities involved in construction projects to meet a set of one or more construction objectives. Construction objectives achieved help with cost optimization, human resource optimization, task optimization, material optimization and sustainability factors, among others. The artificial intelligence system is designed to receive a plurality of input data sets and derive a plurality of first intermediary data sets (cognitive, statistical, and/or temporal-based) that may have a potential impact on the construction project. Each of the plurality of input data sets is processed to achieve the set of one or more construction objectives. The artificial intelligence system is further configured to process the plurality of input data sets using one or more respective ensembles of inferencing and cognitive machine learning models. A respective ensemble of machine learning models is determined based on the associated objective(s) and an input data set, which may be an available, predicted, or inferred data set. The artificial intelligence system is configured to generate machine knowledge validated decision sets (e.g., the first intermediary data sets) and recommendations, having processed the plurality of accumulated data, trained/gained knowledge and leveraging human intellect for accuracy validation. The artificial intelligence system is further configured to implement a supervisory machine learning model to generate an optimized recommendation for the construction activity based on the accumulated knowledge, validated learnings, data sets and pairs to match the given construction objective(s).

The input data sets may include, among others, analyzed in-progress and post-event quality metrics. The ensembles of machine learning models may relate to: real time climate and forecasted weather, celestial weather patterns, microclimate factors; topographic analysis, structural analysis; quality analysis; inventory utilization and forecasts; regulatory compliance; labor and efficiency metrics and global events impact metrics; supply chain; equipment and Internet of Things (IoT) metrics; and labor efficacy. System cognition may be a derivative of modeling human decision making, inputs and actions under multiple scenarios and mirroring simulated outcomes. System recommendations may be evaluated for outcome efficiencies and calibrated for ground truth realities.

In an aspect, a computer-implemented method for multi-factor optimization of schedules and resource recommendations for smart construction is provided. The method comprises: receiving a schedule request for a construction activity of a construction project, the schedule request identifying at least one construction objective; accessing a plurality of input data sets; applying a plurality of ensembles of machine learning models to the plurality of input data sets to generate a plurality of intermediary data sets that each identifies factors that impact the construction project, wherein each ensemble of machine learning models of the plurality of ensembles of machine learning models generates an intermediary data set according to function objectives of a respective ensemble of machine learning models; determining, based on the intermediary data sets, task data using a graph model; generating, based on the task data, a schedule for the construction activity, the schedule achieving the at least one construction objective; indicating the schedule in response to the schedule request. In an embodiment, the schedule is indicated via at least one of a graphical user interface, voice, and messaging.

In an embodiment, the method further comprises applying a stochastic model to the plurality of intermediary data sets to determine correlation data of the factors that impact the construction project; applying the graph model to the correlation data and tenant data to generate the combination data.

In an embodiment, the method further comprises receiving feedback data pertaining to issues related to the construction project; using the feedback data to modify the stochastic model; updating the schedule for the construction project. In an embodiment, the feedback data is received as user input via a graphical user interface. In an embodiment, the feedback data is received by: receiving a live camera feed from a construction site; determining efficiency issue data relating to the construction project from the live camera feed; generating the feedback data from the efficiency issue data.

In an embodiment, generating a schedule comprises: determining a variance data between actual construction and expected construction based on the schedule; using the variance data to refine the schedule.

In an embodiment, the plurality of ensembles of machine learning models includes at least one of a climate analysis module configured to analyze weather patterns from at least one input data set of the plurality of input data sets, a structural analysis module configured to analyze quality and design from at least one input data set of the plurality of input data sets, a quality analysis module configured to analyze progress from at least one input data set of the plurality of input data sets, an inventory analysis module configured to analyze inventory from at least one input data set of the plurality of input data sets, a regulatory module configured to analyze completion timeliness, based on requirements, from at least one input data set of the plurality of input data sets, a global event impact module configured to analyze global events from at least one input data set of the plurality of input data sets, a supply chain analysis module configured to analyze supply and delivery from at least one input data set of the plurality of input data sets, an equipment health and Internet of Things (IoT) metric analysis module configured to analyze equipment needs and procurement factors from at least one input data set of the plurality of input data sets, and a labor efficiency module configured to analyze labor availability and skills from at least one input data set of the plurality of input data sets.

BRIEF DESCRIPTION OF THE FIGURES

Further advantages of the present disclosure will become apparent by reference to the detailed description of preferred embodiments when considered in conjunction with the drawings.

DETAILED DESCRIPTION

Figure 1:
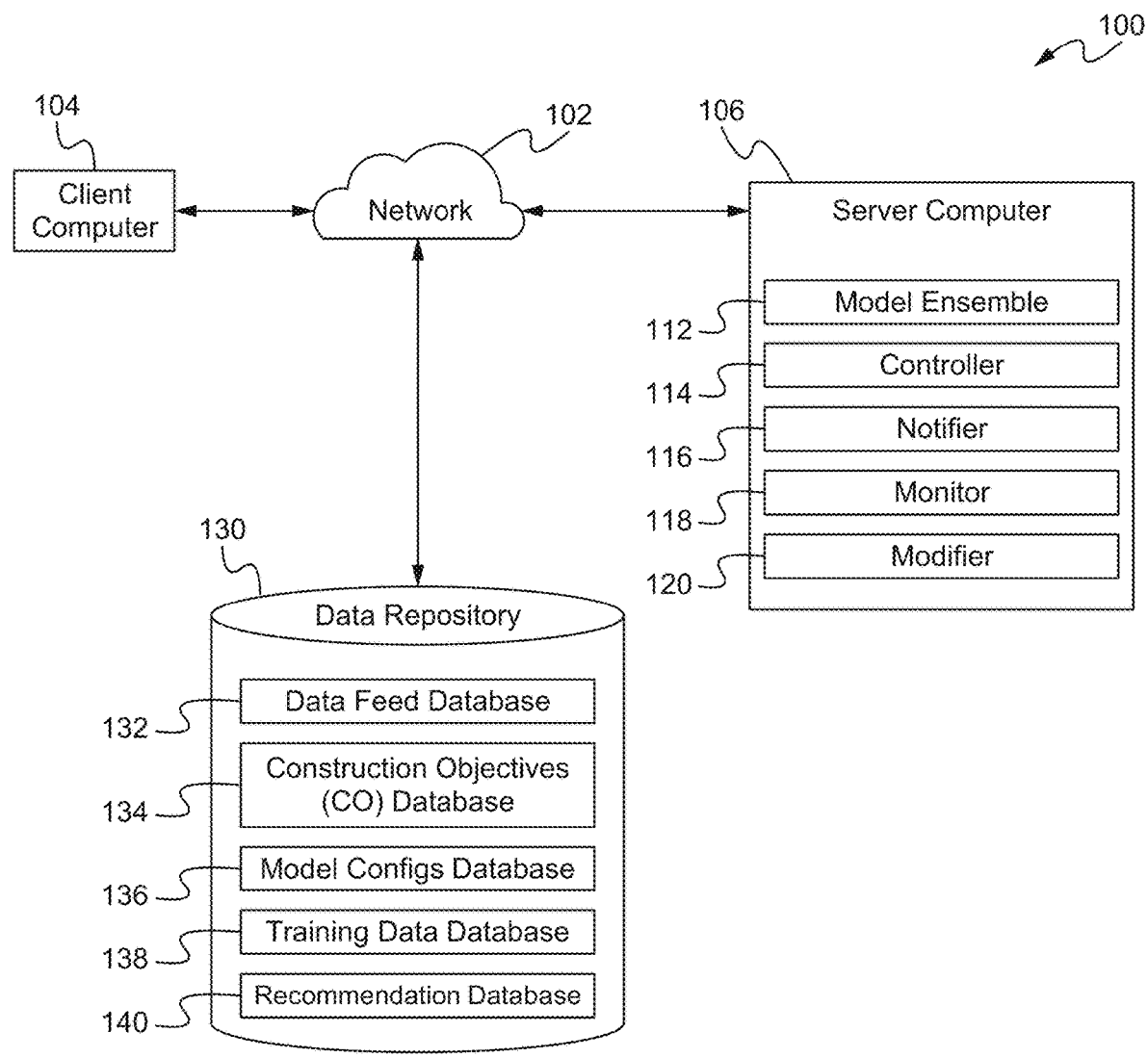
FIG. 1 illustrates an example networked computer system with which various embodiments may be practiced.

The following detailed description is presented to enable a person skilled in the art to make and use the systems and methods of the present disclosure. For purposes of explanation, specific details are set forth to provide an understanding of the present disclosure. However, it will be apparent to one skilled in the art that these specific details are not required to practice the embodiments of the present disclosure. Descriptions of specific applications are provided only as representative examples. Various modifications to the embodiments described herein will be apparent to one skilled in the art, and the general principles defined herein may be applied to other embodiments and applications without departing from the scope of the present disclosure. The present disclosure is not intended to be limited to the embodiments shown but is to be accorded the widest possible scope consistent with the principles and features disclosed herein.

Embodiments are described herein in sections according to the following outline:
1.0 GENERAL OVERVIEW
2.0 STRUCTURAL OVERVIEW
3.0 FUNCTIONAL OVERVIEW
   3.1 MODEL ENSEMBLE
   3.2 CONTROLLER
      3.2.1 ANALYTICAL AGGREGATOR AND CORRELATION ANALYZER
      3.2.2 GRAPH MODEL
      3.2.3 SCHEDULE RECOMMENDER
         3.2.3.1 EFFICACY METRICS ANALYSIS MODULE
         3.2.3.2 SCHEDULE VARIANCE MODULE
         3.2.3.3 CONTRACTOR IMPLEMENTATION MODULE 3.3 NOTIFIER
3.4 MONITOR
3.5 MODIFIER
4.0 FLOW EXAMPLES
5.0 PROCEDURAL OVERVIEW
6.0 HARDWARE OVERVIEW
7.0 SOFTWARE OVERVIEW
8.0 OTHER ASPECTS OF DISCLOSURE 1.0 General Overview An artificial intelligence system provides a digitally optimized schedule for a construction activity to meet a construction objective(s) of a construction project. Example construction activities include clearing, grading, excavation, drilling foundation, concrete pour, wood work, system buildout and the like. Example construction objectives include a time objective, a budget/cost objective, a quality objective, a health objective and the like. The artificial intelligence system is configured to receive a plurality of input data sets that impact the construction project. Each of the plurality of input data sets is processed to achieve the construction objective(s). The artificial intelligence system is configured to process the plurality of input data sets using one or more different ensembles of machine learning models. An ensemble of machine learning models generates a machine learning validated data set (e.g., first intermediary data set). The artificial intelligence system is further configured to determine task data set (e.g., second intermediary data sets) from one or more machine learning validated data sets. The artificial intelligence system is further configured to implement a supervisory machine learning model to generate an optimized schedule for the construction activity based on at least the task data sets and the construction objective(s).

In an embodiment, a construction objective for one of the pluralities of input data sets may be independent of each of the other plurality of input data sets.

In an embodiment, the artificial intelligence system is configured to receive feedback on the optimized schedule for the construction activity. The feedback may be manually provided to the artificial intelligence system by a user via an input interface (e.g., a graphical user interface) of a manual construction monitor, automatically provided by an automated construction monitor, or both.

In an embodiment, the artificial intelligence system is further configured to determine a variance between actual construction progression and expected construction progression based on the system recommendation and guidance and to formulate further refinements in the schedule and resourcing for the construction activities based on the determined variance. A revised formulation factors in the variance and looks ahead to the next number of predetermined weeks (e.g., six weeks) to scan and see if any additional factors need to be accounted for given the current variance.

In an embodiment, the artificial intelligence system is further configured to implement an ensemble of closed-loop efficiency analysis machine learning models that are self-tunable and/or self-trainable using new training data, including the feedback. The closed-loop efficiency analysis machine learning models may include one or all of the machine learning models described herein.

Other embodiments, aspects, and features will become apparent from the reminder of the disclosure as a whole.

2.0 Structural Overview

FIG. 1 illustrates an example networked computer system 100 with which various embodiments may be practiced.

FIG. 1 is shown in simplified, schematic format for purposes of illustrating a clear example and other embodiments may include more, fewer, or different elements. FIG. 1 and the other drawing figures and all of the description and claims in this disclosure are intended to present, disclose and claim a technical system and technical methods comprising specially programmed computers, using a special-purpose distributed computer system design and instructions that are programmed to execute the functions that are described. These elements execute functions that have not been available before to provide a practical application of computing technology to the problem of optimizing schedule, resource allocation and work sequencing for Architecture, Engineering, and Construction (AEC) planning and execution. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In some embodiments, the networked computer system 100 comprises a client computer(s) 104, a server computer 106, a data repository(ies) 130, which are communicatively coupled directly or indirectly via a network(s) 102. In an embodiment, the server computer 106 broadly represents one or more computers, such as one or more desktop computers, server computers, a server farm, a cloud computing platform (like Amazon EC2, Google Cloud, container orchestration (Kubernetes, Docker, etc.)), or a parallel computer, virtual computing instances in public or private datacenters, and/or instances of a server-based application.

The server computer 106 includes one or more computer programs or sequences of program instructions that are organized to implement artificial intelligence/machine learning algorithms to generate data pertaining to consideration factors in a construction project, controlling functions, notifying functions, monitoring functions, and modifying functions. Programs or sequences of instructions organized to implement the consideration factor data generating functions in this manner may be referred to herein as a model ensemble 112. Programs or sequences of instructions organized to implement the controlling functions may be referred to herein as an optimizer engineering and construction scheduler supervisor controller 114. Programs or sequences of instructions organized to implement the notifying functions may be referred to herein as a notifier 116. Programs or sequences of instructions organized to implement the monitoring functions may be referred to herein as an efficiency analysis and process monitor 118. Programs or sequences of instructions organized to implement the modifying functions may be referred to herein as a modifier 120.

The model ensemble 112, the controller 114, the notifier 116, the monitor 118, and/or the modifier 120 may be part of an artificial intelligence (AI) platform implemented by the server computer 106. In some embodiments, one or more components of the server computer 106 may include a processor configured to execute instructions stored in a non-transitory computer readable medium.

In some embodiments, the model ensemble 112 comprises a plurality of modules, each module programmed to receive a data feed and to determine, based on pertinent segments of the data feed relevant to function objective(s) of a respective module, a first intermediary data set that includes consideration factors in a construction project. The data feed includes metadata or tags at the initial section of the data fee, the metadata or tags identifying segments and corresponding data types. Alternatively, the metadata or tags are mixed in the data feed. For example, each data segment may include metadata indicating a data type that the data segment pertains to. If the data type corresponds with the function objective of the respective module, then the respective module will process that data segment. For example, a Micro-Climate Analysis Module would only process those segments of a data feed that are relevant to the function objectives of the Micro-Climate Analysis Module (e.g., weather analysis, prediction, determination, recommendation, etc.). Put differently, the Micro-Climate Analysis Module identifies and processes those segments that have metadata indicating a weather data type. If a data feed includes only weather data, then the Micro-Climate Analysis Module would then process the entire data feed. If a data feed does not include any weather data, then that data feed is not processed by the Micro-Climate Analysis Module.

In some embodiments, the controller 114 is programmed to generate an optimized schedule for the construction project based on factors (e.g., first intermediary data sets) determined by the model ensemble 112. The optimized schedule may be further optimized or updated based on feedback from the monitor 118.

In some embodiments, the notifier 116 is programmed to relay notifications, such as an optimized schedule and other recommendations, to users. For example, notifications may be indicated in a user interface (e.g., a graphical user interface) or via voice or messaging. The notifier 116 may receive such notifications from the controller 114 and the data repository 130.

In some embodiments, the monitor 118 is programmed to receive feedback that may be used to make corrections and changes at the controller 114, such as at an analytical aggregator of the controller 114. Example feedback may be manually provided via an input interface (e.g., graphical user interface) about issues and problems such as construction status, delays, etc., or may be automatically determined by the monitor 118. The monitor 118 is also programmed to receive data feeds from one or more external sources, such as on-site sensors or videos, and to store the data feeds in the data repository 130.

In some embodiments, the modifier 120 is programmed to receive modification data to update existing artificial intelligence models in the system 100 and to add new artificial intelligence models to the system 100. Modification data may be input by a user via an input interface (e.g., a graphical user interface).

In some embodiments, in keeping with sound software engineering principles of modularity and separation of function, the model ensemble 112, the controller 114, the notifier 116, the monitor 118, and the modifier 120 are each implemented as a logically separate program, process or library.

Computer executable instructions described herein may be in machine executable code in the instruction set of a CPU and may have been compiled based upon source code written in Python, JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the figure may represent the manner in which programmers or software developers organize and arrange source code for later compilation into an executable, or interpretation into bytecode or the equivalent, for execution by the server computer 106.

The server computer 106 may be coupled to the data repository 130 that includes a data feed database 132, a construction objectives (CO) database 134, a model configuration database 136, a training data database 138, and a recommendation database 140.

In some embodiments, the data feed database 132 stores a plurality of data feeds collected from various sources such as a construction site or AEC site, third-party paid or commercial databases, and real time feeds, such as RSS, or the like. A data feed may include data segments pertaining to real time climate and forecasted weather data, structural analysis data, in-progress and post-construction data, such as modular analysis of quality data, inventory utilization and forecast data, regulatory data, global event impact data, supply chain analysis data, equipment & Internet of Things (IoT) metric analysis data, labor/efficiency data, and/or other data that are provided to the modules of the model ensemble 112 in line with respective construction objective(s). A data feed may include tenant data relating to other activities of the construction project, to other construction projects, or both. Each data segment may include metadata indicating a data type of that data segment. As described herein, the real time data, near real time data, and collated data are received by the monitor 116 and are processed by various components of the server computer 106.

For example, a data feed received by the monitor 116 is stored in the data feed database 132 and is processed by different modules of the model ensemble 112, each generating first intermediary data sets, which are provided within the artificial intelligent platform for dynamic schedule generation through the controller 114. For example, another data feed received by the monitor 116 is stored in the data feed database 132 and is processed by the controller 114 (e.g., schedule recommender 226 of the controller 114 illustrated in FIGS. 3A and 3B) to determine a variance between the actual construction and an expected construction to further optimize schedules. For example, yet another data feed received by the monitor 116 is stored in the data feed database 132 and is processed by the controller 114 (e.g., combinatorial analysis knowledge and semantic graphs 224 of the controller 114 illustrated in FIGS. 3A and 3B) to access impact on factors relating to the construction project or the construction activity.

In some embodiments, the CO database 134 includes a plurality of construction objectives. Each of the plurality of data feeds in the data feed database 132 is processed to achieve one or more construction objectives of the plurality of construction objectives in the CO database 134. The construction objectives are a collective of different user requirements, project requirements, regulatory requirements, technical requirements, or the like. Construction objectives may be established prior to construction activities starting and can be adjusted during construction phases to factor in varying conditions. Construction objectives are defined at each construction project and construction phase level. Data definition of construction objectives defines normalized construction objectives. Data definition includes, for example, parameters for optimization of construction schedule to meet time objectives, optimization for cost objectives, optimization for Carbon footprint objectives, which are normalized to factor in worker health, minimize onsite workers, and minimize quality issues. One or more construction objectives may be identified as part of a schedule request for a construction activity of a construction project.

As an illustration, consider the following scenario. A construction objective is to keep the cost below the budgeted amount. Data feeds during construction phase send in data collected and generated in the system. The system checks the data feeds against the established objectives and optimizes guidance to be inline for set objectives. For example, if incoming data feeds indicate construction completion date may exceed stated end date, then the system analysis, through smart agents, may indicate adding additional construction workers and procuring materials from a nearby supplier at a higher cost to minimize shipping time can help meet the completion date. Since the desired objective is to keep the cost below or at the allotted budget level, system recommendation will be to continue work at the current pace with the current mandates. This system recommendation will have checked both the CO database 134 as well as any legal commitments before giving its recommendation. In a different scenario, if the construction objective was to honor the set construction completion date, then the system recommendation could have suggested adding additional construction workers, procuring material from a nearby supplier among other considerations. Details of system recommendation are further discussed herein.

In some embodiments, the model configuration database 136 includes configuration data, such as parameters, gradients, weights, biases, and/or other properties, that are required to run the artificial intelligence models after the artificial intelligence models are trained.

In some embodiments, the training data database 138 includes training data for training one or more artificial intelligence models of the system 100. The training data database 138 is continuously updated with additional training data obtained within the system 100 and/or external sources. Training data includes historic customer data and synthetically algorithm generated data tailored to test efficiencies of the different artificial intelligence models described herein. Synthetic data may be authored to test a number of system efficiency coefficients. This may include false positive and negative recommendation rates, model resiliency and model recommendation accuracy metrics. An example of training data set may include data relating to task completion by a contractor earlier than a projected time schedule. Another example of training data set may include data relating to quality issues on the work completed by the contractor on the same task.

In some embodiments, the recommendation database 140 includes recommendation data, such as optimized schedules generated by the controller 114. An example construction schedule includes all tasks ordered by priority, grouped tasks known as work packages, and resources assigned to the tasks. Schedule optimization includes, shortest path for meeting the construction objective(s), selective work packages to include, supplier recommendation (based on proximity, quality and cost) and contractor recommendation. As discussed herein, schedule optimization is dynamic and factors in current schedule progression, anticipated impedance and impact due to quality issues and supply constraints.

The data repository 130 may include other databases storing data that may be used by the server computer 106. Each database 132, 134, 136, 138, and 140 may be implemented using memory, e.g., RAM, EEPROM, flash memory, hard disk drives, optical disc drives, solid state memory, or any type of memory suitable for database storage.

The network 102 broadly represents a combination of one or more local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network 102 and the disclosure presumes that all elements of FIG. 1 are communicatively coupled via the network 102. The various elements depicted in FIG. 1 may also communicate with each other via direct communications links that are not depicted in FIG. 1 to simplify the explanation.

The server computer 106 is accessible over the network 102 by a client computer 104 to request a schedule or a resource recommendation. The client computer 104 may comprise a desktop computer, laptop computer, tablet computer, smartphone, or any other type of computing device that allows access to the server computer 106. The elements in FIG. 1 are intended to represent one workable embodiment but are not intended to constrain or limit the number of elements that could be used in other embodiments.

3.0 Functional Overview

The server computer 106, including the model ensemble 112, the controller 114, the notifier 116, the monitor 118, and the modifier 120, and the data repository 130 interoperate programmatically in an unconventional manner, depending on use requirements, to generate schedules and resource recommendations.

3.1 Model Ensemble

In an embodiment, the model ensemble 112 of FIG. 1 includes a plurality of modules that communicate with each other. Each of the plurality of modules includes an ensemble of one or more machine learning models.

Machine learning models may include appropriate classifiers and ML methodologies. Some of the ML algorithms include (1) Multilayer Perceptron, Support Vector Machines, Bayesian learning, K-Nearest Neighbor, or Naïve Bayes as part of supervised learning, (2) Generative Adversarial Networks as part of Semi Supervised learning, (3) Unsupervised learning utilizing Autoencoders, Gaussian Mixture and K-means clustering, and (4) Reinforcement learning (e.g., using a Q-learning algorithm, using temporal difference learning), and other suitable learning styles. Knowledge transfer is applied, and, for small footprint devices, Binarization and Quantization of models is performed for resource optimization for ML models. Each module of the plurality can implement one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Eclat algorithm, etc.), an artificial neural network model (e.g., a Perceptron method, a back-propagation method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, multidimensional scaling, etc.). Each processing portion of the system 100 can additionally leverage: a probabilistic, heuristic, deterministic or other suitable methodologies for computational guidance, recommendations, machine learning or combination thereof. However, any suitable machine learning approach can otherwise be incorporated in the system 100. Further, any suitable model (e.g., machine learning, non-machine learning, etc.) can be used in the system 100.

The model ensemble 112 receives input data from the data repository 130. For example, the model ensemble 112 receives one or more data feeds from the data feed database 132 and predicts or otherwise generates a first intermediary data set(s), for each data feed, that is further processed by the controller 114.

Figure 2A:
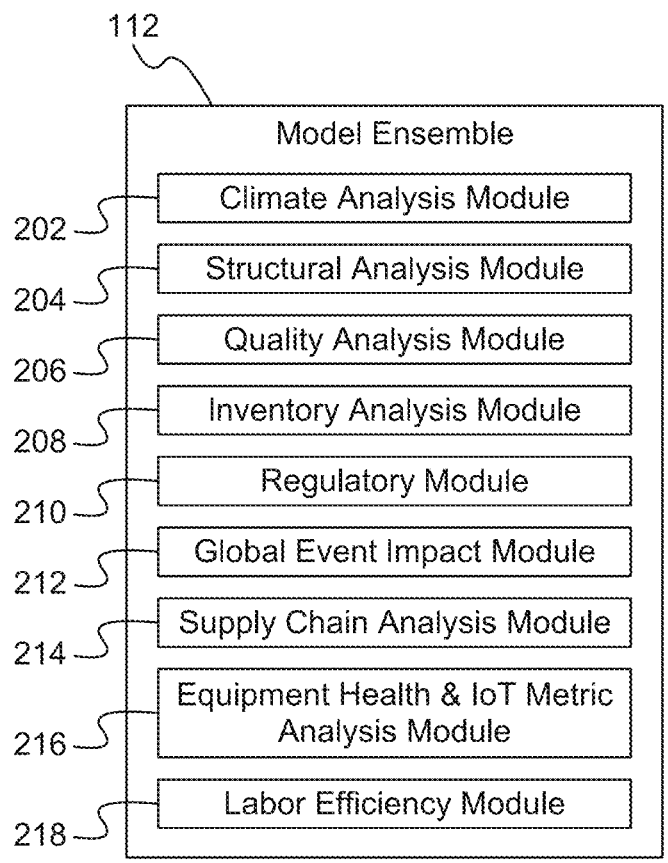
FIG. 2A illustrates an example model ensemble, according to an embodiment.

As illustrated in FIG. 2A, in some embodiments, the model ensemble 112 may include a Climate Analysis Module 202, a Structural Analysis Module 204, a Quality Analysis Module 206, an Inventory Analysis Module 208, a Regulatory Module 210, a Global Event Impact Module 212, a Supply Chain Analysis Module 214, an Equipment Health & Internet of Things (IoT) Metric Analysis Module 216, and a Labor Efficiency Module 218. Each module of the model ensemble 112 may include an ensemble of one or more machine learning models.

The Climate Analysis Module 202 of the model ensemble 112 receives one or more input data sets for analysis of localized historical weather patterns, microclimate analysis, forecasted weather analytics, stochastic modeling of events, correlation to supply storage, supply availability, shipping, correlation to working conditions, correlation to materials and material behavior (e.g., curing of weatherized cement), and analysis of drainage, wind, sand, etc. Machine learning models of the Climate Analysis Module 202 provide climate factors in real time as well as what is projected for the next several weeks, and so forth. The input data sets may also include historical weather/climate patterns of the locality during the construction phase. As discussed herein, the monitor 118 of FIG. 1 may assist the Climate Analysis Module 202 to collect relevant input data sets. The Climate Analysis Module 202 can dynamically receive these inputs and provide recommendations that are optimized for weather-related events.

The Structural Analysis Module 204 of the model ensemble 112 receives one or more input data sets for analysis of quality and design considerations, structural integrity, etc. throughout the construction phase. The input data sets may be obtained, for example, through simulation and/or specific probes, and the like. The input data sets are factored into the construction updates and any rework and rescheduling of tasks, as needed, are recommended. Any impact on labor, cost, time, material, and schedule due to issues, such as quality issues, are then further taken into consideration for optimizing the schedule. The Structural Analysis Module 204 also provides data on structural status, monitors work progression, receives video inputs of construction progress, evaluates the automated input (e.g., from a computer vision input) and determines task/work progression to predict/estimate a percentage of completion (e.g., about 40% or 60% complete, etc.). For example, while a user input may indicate that a task has been being completed, the Structural Analysis Module 204 can determine the actual status of the task based on the multiple input parameters and conclude that certain aspects of the task are incomplete or need to be reworked. As discussed herein, the monitor 118 may assists the Structural Analysis Module 204 to collect relevant input data sets.

The Quality Analysis Module 206 of the model ensemble 112 receives one or more input data sets for analysis of progress through user inputs, computer vision (e.g., Video feeds, static image captures, infra-red, LIDAR, LASER, etc.), and quality evaluation through human and/or machine inspection to determine cost of poor quality (material cost, time, labor, etc.), time and labor assignment, and the like. As discussed herein, the monitor 118 may assist the Quality Analysis Module 206 to collect relevant input data sets. Cost of poor quality may involve loss of revenue (not being able to deliver on promised timelines and promised quality), rework costs, additional labor and material costs and potential legal and regulatory issues.

The Inventory Analysis Module 208 of the model ensemble 112 receives one or more input data sets for analysis of just-in-time inventories and forecasting. Machine learning models of the Inventory Analysis Module 208 determine how much inventory is needed based on available stock, rate of utilization, etc., to forecast inventory requirement. For example, about 500 steel beams were thought to be required for a particular task, but the pace of utilization may be slow largely because the construction is still behind on the task. Accordingly, the Inventory Analysis Module 208 analyzes the inputs to determine whether to recommend procurement or to delay it. As discussed herein, the monitor 118 may assist the Inventory Analysis Module 208 to collect relevant input data sets.

The Regulatory Module 210 of the model ensemble 112 receives one or more input data sets for analysis of completion timelines based on legal contracts, regulatory requirements, etc. For example, certain tasks may be contractually obligated. There may be penalties for delays, or there may be local or federal regulations that may impact the construction, for example, requirements with respect to emission standards, flood mitigation protocols, fire code compliance, etc. The Regulatory Module 210 analyzes various contracts, applicable regulations, and other requirements using Natural Language Processing (NLP) algorithms to monitor construction progression in order to ensure compliance. As discussed herein, the monitor 118 may assist the Regulatory Module 210 to collect relevant input data sets.

The Global Event Impact Module 212 of the model ensemble 112 receives one or more input data sets for analysis and tracking of impact of both simple and complex global events, such as geopolitical events, supply chain impacts, global weather, incidents at manufacturing plants, shipping line issues, market factors—e.g., steel prices futures, cement futures and so on—to plan for procurement and schedule/task revisions, as required. Geopolitical events that potentially could impact business, sourcing of a material, or supply chain factors impacting procurement of material, etc., may be monitored and analyzed. The Global Event Impact Module 212 monitors for these occurrences and automatically reorients, reprioritizes, and refactors the construction schedule and associated activities accordingly. The Global Event Impact Module 212 analyzes simple as well as complex events and modifies the schedule accordingly. As discussed herein, the monitor 118 may assist the Global Event Impact Module 212 to collect relevant input data sets.

The Supply Chain Analysis Module 214 of the model ensemble 112 receives one or more input data sets for analysis of task maps (listing of tasks/schedules), supplier analysis, estimated procurement time, historical efficacy analysis, time to value—from ordering to delivering (e.g., cost, time, carbon considerations, etc.)—and plans procurement based on current progress and projected tasks, onsite/offsite storage factors, and the like. This may also be a factor in the global event impact analysis. The Supply Chain Analysis Module 214 identifies an optimum place to procure materials and the optimum time to procure them. The place and time may be optimized to meet construction objectives, for example, cost, sustainability, environmental objectives, and business objectives. As discussed herein, the monitor 118 may assist the Supply Chain Analysis Module 214 to collect relevant input data sets.

The Equipment Health & IoT Metric Analysis Module 216 of the model ensemble 112 receives one or more input data sets for analysis of equipment needs and procurement factors (e.g., how long does it take to procure equipment, where it can be sourced, proximity analysis, etc.), equipment quality factors (e.g., onsite quality issues, operators needed, historical issues analysis, etc.), cost and carbon considerations, IoT feeds for fuel consumption and equipment health (e.g., real time equipment health analysis), alternative course mapping (e.g., if an equipment fails what's the recourse, where can alternatives be sourced—as a consideration for planning and selection of equipment vendors/rentals), and the like. The Equipment Health & IoT Metric Analysis Module 216 analyzes or monitors different equipment that provide signals—e.g., diesel is low in the earth moving equipment so more diesel has to be procured to keep the equipment operational, another machine is on the verge of failing based on vibrational or acoustic analysis, etc. The Equipment Health & IoT Metric Analysis Module 216 analyzes these inputs and determines the impact on the schedule, or before they can impact the schedule, and alerts a user for necessary remedial action. As discussed herein, the monitor 118 may assist the Equipment Health & IoT Metric Analysis Module 216 to collect relevant input data sets.

The Labor Efficiency Module 218 of the model ensemble 112 receives one or more input data sets for analysis of task maps (listing of tasks/schedules), current labor availability and skills analysis, efficacy analysis (e.g., pace of completion, quality metrics, etc.), historical trends (e.g., past efficiencies, remarks, commentary, Cost of Poor Quality analysis, etc.), current work efficiency and projections, labor health factors (e.g., injuries, overtime, etc.), projected labor demands/geographical considerations, macro factors (e.g., over the life span of the construction project), micro factors (e.g., near term needs/proximity to deadlines), and the like. The Labor Efficiency Module 218 further determines efficiency metrics based on factoring, for example, labor issues, the pace at which the construction happens, quality issues, etc. The Labor Efficiency Module 218 provides recommendations that adjust a task based on the efficiency analysis. As discussed herein, the monitor 118 may assist the Labor Efficiency Module 218 to collect relevant input data sets.

The above-described external data sources, modules, models, or programs are shown by way of example. Different business needs may require additions to or modifications of different modules or data sets for a particular function.

Each module may act in isolation and optimized for whatever each module is being incentivized to optimize for its part. However, the controller 114 communicates with the modules and acts as a supervisory controller algorithm that combines all the module outputs (e.g., first intermediary data sets) and optimizes an overall schedule to achieve the intended construction objectives.

3.2 Controller

Figure 2B:
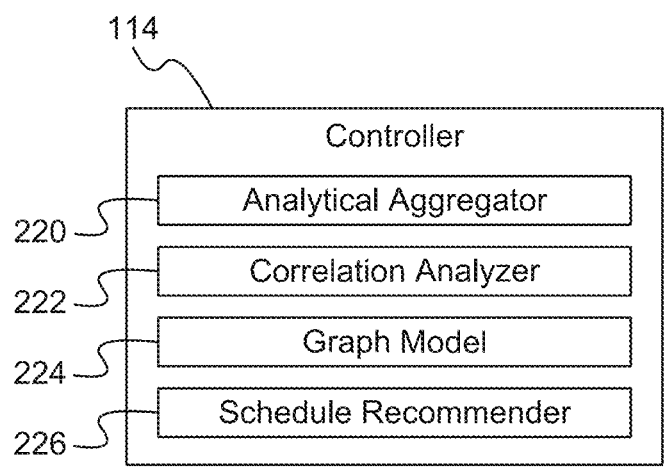
FIG. 2B illustrates an example controller, according to an embodiment.

As illustrated in FIG. 2B, in an embodiment, the optimizer engineering and construction scheduler supervisor controller 114 of FIG. 1 includes an analytical aggregator 220, a correlation analyzer 222, a combinatorial analysis knowledge and semantic graph model 224, and a schedule recommender 226.

3.2.1 Analytical Aggregator and Correlation Analyzer

The analytical aggregator 220 analyzes information, such as the first intermediary data sets from the model ensemble 112, to determine a subset of data from the first intermediary data sets that are relevant to the construction objectives and the construction activity, and performs correlations of the data subset and the current construction scenario (e.g., ground truth), using self-learning multi factor predictive and stochastic analysis. In some embodiments, the analytical aggregator 220 determines what data is relevant, from the first intermediary data sets, to the construction objectives and uses the correlation analyzer 222 to correlate various outputs of the machine learning models (e.g., data subset determined to be relevant and output by the analytical aggregator 220) to the current construction scenario.

3.2.2 Graph Model

Correlation data output by the correlation analyzer 222 is input to the combinatorial analysis knowledge and semantic graph model 224. The combinatorial analysis knowledge and semantic graph model 224 uses graphical representations in the form of knowledge graphs as well as social graphs to generate weighted tasks. The knowledge and social graphs have multiple nodes and perform specific functions and analyze data sets, such as tenant data sets including data from another activity of the construction projection and/or data from another construction project, to assess an impact on factors relating to the current construction project or construction activity. For example, are the global events really going to be impacting the schedule and if so, what is the proximity of this impact; does it impact a singular task or does it impact an entire work package, or does it impact the entire construction site, etc.

3.2.3 Schedule Recommender

The combinatorial analysis knowledge and semantic graph model 224 provides analyzed output, including weighted tasks (e.g., tasks with weighted values indicating importance of priority), to the schedule recommender 226. The schedule recommender 206 recommends, from at least the weighted tasks, a dynamic schedule as output (e.g., to a user).

In an embodiment, the schedule recommender 206 may include an efficacy metrics analysis module, a schedule variance module, and a contractor implementation module, that alone or together implement a supervisory machine learning model to refine schedules.

3.2.3.1 Efficacy Metrics Analysis Module

Efficacy metrics are computationally graded, evaluated, imputed using outputs of related processes (e.g., analytical aggregator 220, correlation analyzer 222, combinatorial analysis knowledge and semantic graph model 224, etc.) including analytic aggregation, correlations of past and present data, and insight (accumulated knowledge for comparative analysis) inferences.

Algorithms employed may include decision trees, decision graphs, linear discriminant analysis, and mathematical imputations. Mathematical imputation may involve computing a schedule performance index, which is a measure of historic and current schedules and comparing it to a current task progression percentage and severity of tasks. Efficacy metrics is one aspect of the system that helps improve efficiencies in a construction process.

Supervisory model evaluation may involve composition and analysis of simulated and realized scenarios and evaluating different data and model features. Feature weights may be dimensionally varied to support the model execution. One model may highlight a desired efficacy outcome and use simulation to feed the decision graph in coming up with multiple paths (schedule and tasks) to achieve the outcome. Discriminant analysis feeds off predictions factoring in current scenarios. Different feature weights factor in, for example, seasonality, workers onsite, worker injury simulation, quality issues, supply constraints among others.

3.2.3.2 Schedule Variance Module

A schedule variance analyzer uses a baseline schedule derived from comparable past schedules and human inputs. Comparative metrics for inclusion into the baseline schedule include the topography of the project location, size, value, the material involved, environmental factors among others. To find comparable past schedules, the system may employ deep neural network algorithms including K-nearest neighbor (K-NN), Convolutional Neural Networks (CNN) towards building confident and interpretable model outputs to formulate a baseline schedule.

Once the baseline schedule is established, current schedule composites are constantly evaluated at frequent time intervals to determine deviations from the baseline schedule. Variance anticipation may be factored into tolerance levels. When such tolerance is exceeded, the decision model ensemble tries to chart course correction to meet the construction objectives.

Model computation may involve algorithmic evaluation by different models in the ensemble. Algorithms leveraged may include traveling salesman problem (TSP), Hamiltonian cycle for distance charging, and dependency pairing of tasks.

In an embodiment, when the variance of current task progression deviates significantly from the baseline schedule with model prediction forecasting inability to meet desired project outcomes, recomposition of the tasks are performed and end state simulation using decision graphs is performed to verify the optimal path to meet the desired project outcomes.

3.2.3.3 Contractor Implementation Module

The contractor implementation module is a recommender system that evaluates construction suppliers' and contractors' efficiencies to make recommendations for supplier/contractor selection for a desired task. In addition, this recommender system shadows current contractor output and progression metrics to factor into its recommendation. When the desired contractor is paired with a set of tasks, the recommender system recommends an optimal path for task implementation based on ground truth computation of on-site metrics and schedule derivatives. Ground truth computation is arrived at by introspecting data inputs including observation reports, daily logs, quality analysis, visual analysis, and voice-based annotations. Example models and algorithms may leverage Latent Semantic Analysis (LSA), Correlated Topic Modeling (CTM), Named Entity Recognition (NER) and knowledge graphs. Neural networks that employ convolutions and reinforcement learning may be utilized to process image-based inferences.

A Generative Adversarial Network (GAN) may be used to evaluate champion challenger scenarios for schedule optimization and schedule recommendations. Essentially, the data segments of the current construction project are factored in with projected outcomes and the GAN establishes two premises: (1) continue with the current plan and factor in efficiency surprises if the variance and progress tolerance is within acceptable limits, and (2) vary the recommendations and reorganize the set of tasks and factor in probability to fill in future progression scenarios.

Both the paths are analyzed and recommendations are made with confidence factors for each recommendation. Recommendations by the contractor implementation module could include rescheduling a set of tasks, substituting materials, substituting suppliers, replacing contractors, or combinations of all of these.

3.3 Notifier

In an embodiment, the notifier 116 of FIG. 1 outputs alerts, notices, recommendations, such as schedules generated by the schedule recommender 226 of the controller 114. For example, recommendation may be output via an output interface (e.g., a graphical user interface), voice, multi-messaging, and/or other forms of communication.

3.4 Monitor

In an embodiment, the monitor 118 of FIG. 1 receives feedback regarding recommendations and/or the construction project. Example feedback includes manual or direct feedback input by users and automated or indirect feedback determined by the server computer 106, such as by the monitor 118. Based on the feedback, the controller 114 generates a further optimized schedule (updated/revised optimized schedule) for the construction project. Example feedback data includes which recommendations were or were not implemented during construction.

In an embodiment, the monitor 118 assists the modules of the model ensemble 112 to collect input data sets (e.g., data feeds) from one or more external sources, store the input data sets in the data feed database 132, and transmit the input data sets to various components of the system 100, such as to the modules of the model ensemble 112 or to the controller 114, from the data feed database 132.

In an embodiment, the monitor 120 also receives machine learning training data from a plurality of external data sources of the model ensemble 112. The plurality of external data sources, models, or programs preferably include several distinct sources of input data sets that may be used for training the machine learning models of the system 100. Trained machine learning modules of the plurality of modules, including the Climate Analysis Module 202, the Structural Analysis Module 204, the Quality Analysis Module 206, the Inventory Analysis Module 208, the Regulatory Module 210, the Global Event Impact Module 212, the Supply Chain Analysis Module 214, the Equipment Health and IoT Metric Analysis Module 216, the Labor Efficiency Module 218, and other modules, provide first intermediary data sets to the controller 114 for dynamic schedule generation. As discussed herein, one or more of these modules of the model ensemble 112 may include deep neural network-based models. Outputs from the modules feed into the controller 114 to generate the optimal schedule by allowing the controller 114 to constantly shadow and monitor multiple parameters of the model ensemble 112.

As discussed herein, the model ensemble 112, the controller 114, and the monitor 118 may implement an ensemble of closed loop efficacy analysis machine learning models. In some embodiments, feedback received/generated at the monitor 118 may be used to tune and retrain the artificial intelligence models used by the system 100.

3.5 Modifier

In an embodiment, the modifier 120 of FIG. 1 receives user input to configure one or more machine learning models or to add new machine learning models by using a management console. The management console may serve as an input interface (e.g., graphical user interface) for communicating with or configuring one or more components of the server computer 106. The management console may be implemented by the modifier 120, or may be embodied in one or more private or public-computing servers and/or be a component of a distributed computing system or a cloud.

4.0 Flow Examples

Figure 3A:
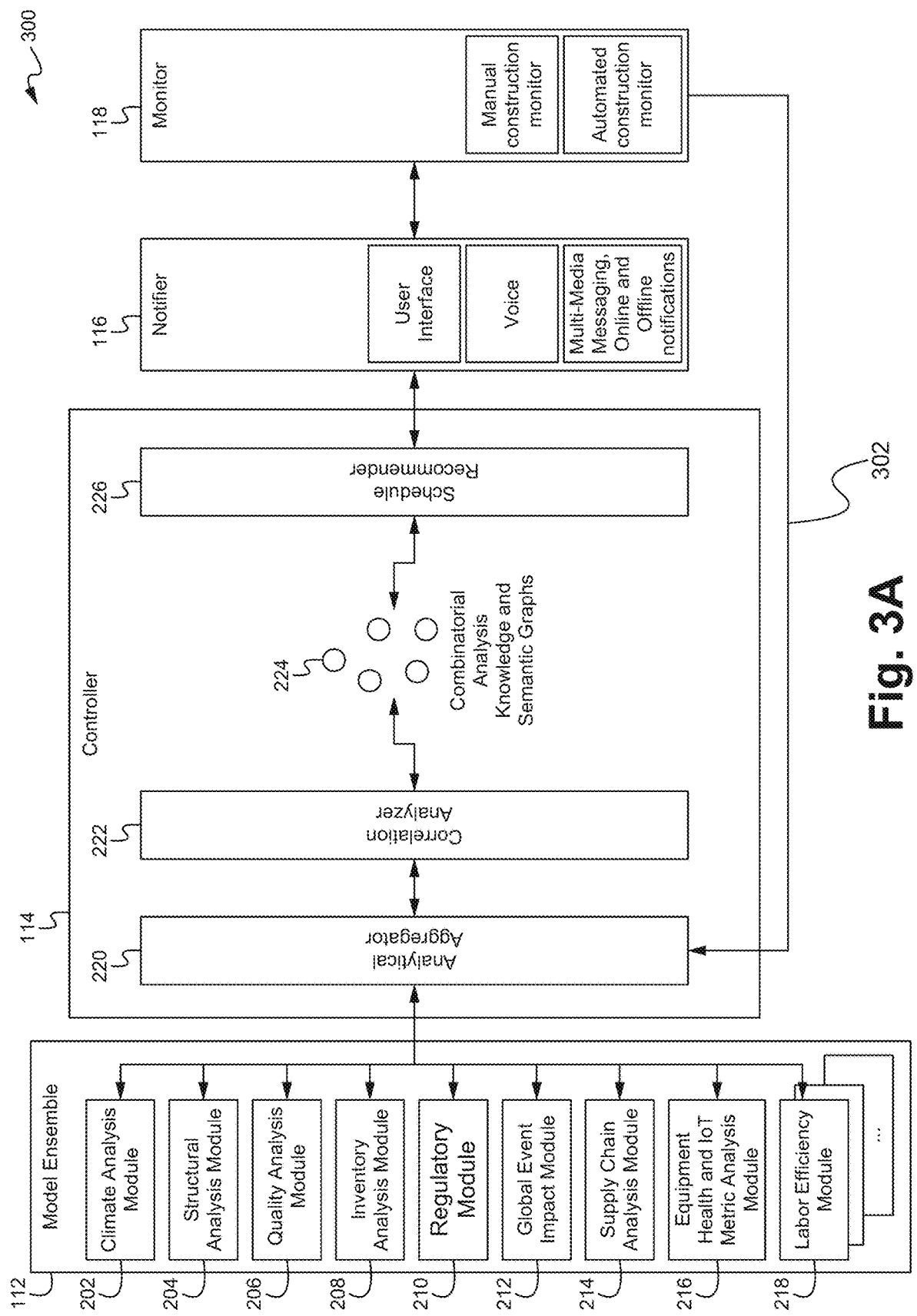
FIGS. 3A-3B each illustrates an example flow diagram of an artificial intelligence platform, according to an embodiment.

FIG. 3A illustrates an example flow diagram 300 of the artificial intelligent platform, according to an embodiment.

As discussed herein, the artificial intelligence platform includes the model ensemble 112, the controller 114, the notifier 116, the monitor 118, and the modifier 120. It is noted that not all components of the artificial intelligence platform are illustrated in FIG. 3A. In an embodiment, the artificial intelligence platform dynamically generates schedules for AEC planning and execution. The artificial intelligent platform may use multi-factor predictive and stochastic analysis and machine learning models to dynamically generate schedules for AEC planning and execution. The artificial intelligence platform provides schedule composition, dynamic monitoring of schedules, and optimization of schedules to meet certain construction objectives.

The model ensemble 112 has one or more modules that include several distinct sources of input data sets. For example, a data set may be used as input for training machine learning models of the model ensemble 112. The modules including the Climate Analysis Module 202, the Structural Analysis Module 204, the Quality Analysis Module 206, the Inventory Analysis Module 208, the Regulatory Module 210, the Global Event Impact Module 212, the Supply Chain Analysis Module 214, the Equipment Health and IoT Metric Analysis Module 216, the Labor Efficiency Module 218, and the like, provide first intermediary data sets to the controller 114 for dynamic schedule generation.

Each module of the model ensemble 112 may be an ensemble of one or more models. For example, the Climate Analysis Module 202 may not be a single model, but may include multiple models: one model may look into the celestial calendar, another model may look at current weather conditions or micro-climate conditions, and yet another model may look at the forecast or projected weather conditions, etc. The models of the Climate Analysis Module 202 generate outputs based on their intrinsic models (e.g., function objectives of the Climate Analysis Module 202). For example, each model works towards a specific function objective, and optimizes its output for its own self-centered function objectives. The outputs from the models are then combined to form an input to the schedule recommender 226.

As another example, the Inventory Analysis Module 208 may use a combination of vision inputs, enterprise resource planning (ERP) system analysis, pace of construction and utilization of material, etc., and generate an output based on analyzing these inputs. Each one of the inputs to the Inventory Analysis module 208 may be analyzed using its respective ensemble of models with appropriate weightage as required to achieve the specific/respective construction objective(s). In every module, multiple functionalities, factors, etc., may be received based on business and/or construction objectives.

The artificial intelligent platform for dynamic schedule generation further receives the scattered, isolated, distinct first intermediary data sets from the modules as inputs and processes them through the analytical aggregator 220. Each of the modules of the model ensemble 112 has a set of defined requirements such as inputs and/or outputs. The analytical aggregator 220 analyzes information and performs correlations using its self-learning multi-factor predictive and stochastic analysis. The analytical aggregator 220 further uses the correlation analyzer 222 to correlate various outputs of these modules. It provides correlation data into the combinatorial analysis knowledge and semantic graph model 224. The combinatorial analysis knowledge and semantic graph model 224 makes use of graphical representations in the form of knowledge graphs as well as social graphs. The graphs have multiple nodes and perform specific functions and analyze data sets to assess an impact on other factors. For example, the analysis graph model 224 uses different tenant knowledge (e.g., knowledge from other construction activities, other construction projects) and applies this knowledge to the current construction activity. The combinatorial analysis knowledge and semantic graph model 224 provides second intermediary data sets including weighted tasks, as the analyzed output, to the schedule recommender 226. The schedule recommender 226 generates, using the weighted tasks, an optimized schedule, which is output to the user by the notifier 116. The schedule may be output via a user interface, voice, messaging, and/or the like.

The monitor 118 receives user or automated feedback 302 and forwards the feedback to the analytical aggregator 220, creating a closed efficacy-analysis loop. The system 100 may factor in any business change or new requirements. For example, the feedback 302 may be generated as an optimized recommendation for a particular construction activity based on accumulated knowledge and validated learnings and data sets and paired to match a construction objective(s). The user may input manual feedback by entry to the system via the user interface about a particular issue, problem, etc., using a manual construction monitor. The monitor 118 may also use an automated construction monitor to automatically calculate or otherwise determine the construction status, delays, problems, local or global issues, timeline, other efficiency issues that may tend to delay, halt or disrupt the construction objective(s) or timelines and provides it as feedback 302 to further augment or correct or flag the issues at hand.

As an illustration, a camera can be employed at a construction site that records the daily work, pace of construction, and progress. The automated construction monitor intelligently matches camera recordings with a work plan or plans and can highlight any issues, and delays and may also ascertain any variance from the user interface-based inputs to determine any erroneous and incorrect information fed into the activity tracker compared to the actual work at the construction site.

Based on the human or automated feedback, the controller 114 receives feedback 302 on the optimized schedule for the construction activity. As described, the artificial intelligent platform is configured to implement an ensemble of closed-loop efficiency analysis machine learning models to generate a further optimized schedule for the construction activity. In an example, the feedback is provided to the artificial intelligent platform by a user via a user interface. In another example, the feedback is automatically provided by the construction monitor.

Figure 3B:
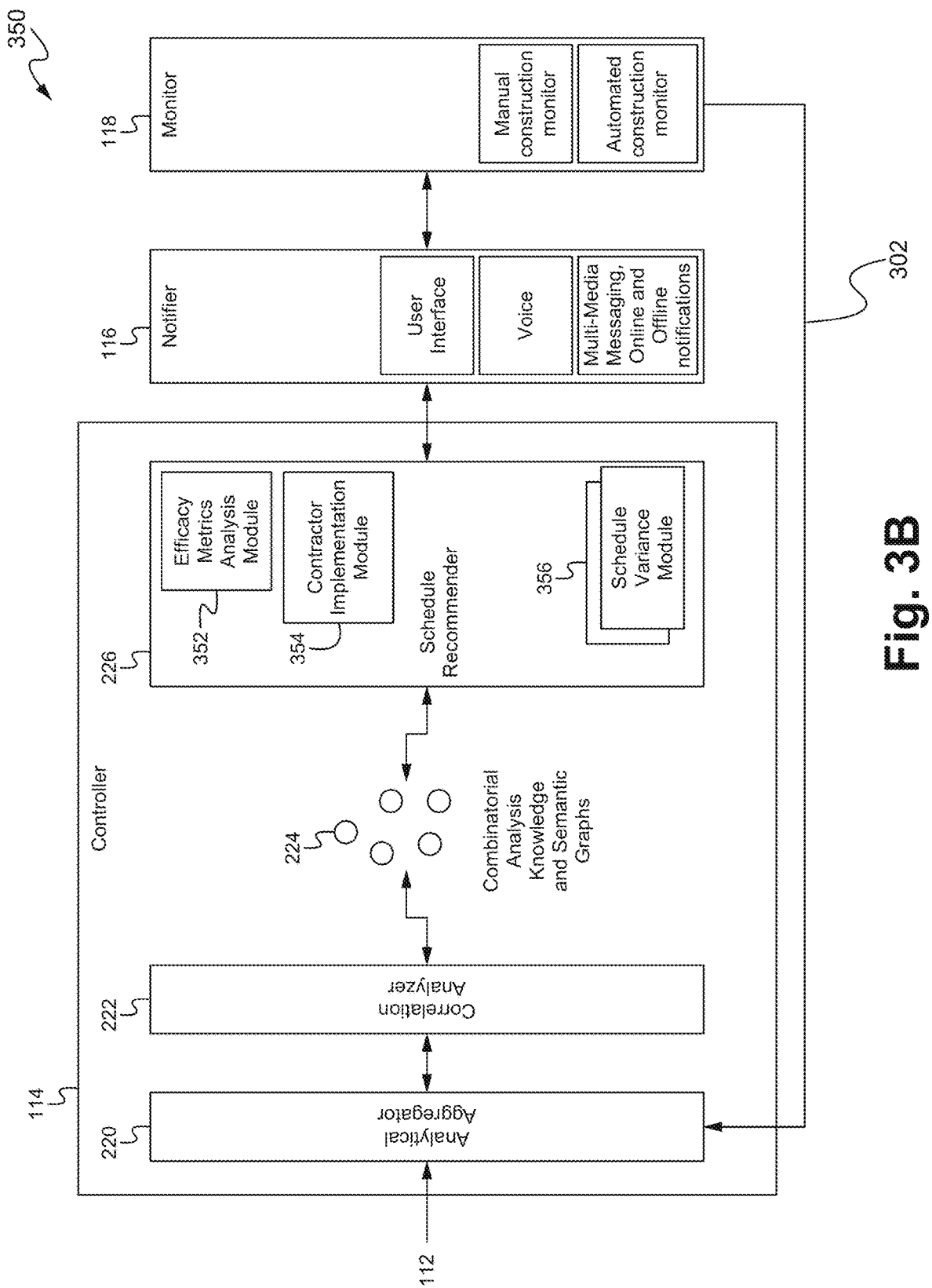

FIG. 3B illustrates an example flow diagram 350 of the artificial intelligent platform, according to an embodiment. The steps illustrated in FIG. 3B are performed in a similar manner as the corresponding steps described in the context of FIG. 3A. Therefore, the steps illustrated in FIG. 3B are not explained again for brevity.

In an embodiment, the schedule recommender 226 provides a recommendation, and the monitor 118 assesses if the recommendation was relevant and efficient in optimizing the schedule, the cost factors, and so forth. The schedule recommender 226 may include a gating mechanism to evaluate its own recommendations and its own performance. For example, the schedule recommender 226 may include an efficacy metrics analysis module 352, a contractor implementation module 354, and a schedule variance module 356.

The efficacy metrics analysis module 352 checks and validates if efficacy metrics are met. The contractor implementation module 354 checks if the user implemented the recommendations, for example, whether the sequencing of tasks provided by the system 100 was implemented/followed or not. The schedule variance module 356 checks if there is a schedule variance from what the system provided and actual on-field work. On-field data may be received through multiple sources and may include manual user entry through a mobile application, information feeds obtained through IoT device sensors, such as motion sensor, altimeter reading, pressure sensor, temperature sensor, quantity measurement through object counts, camera feeds, motion sensor and the like. These data are received, such as by the monitor 118, in real time and near real time as the data is generated and transmitted.

In an embodiment, the system 100 is self-analyzing, both combinatorial efficiency as well as individual model evaluations and efficiencies, and self-learns from the feedback received. The system 100 may also receive data that it may not have been trained on and recalibrates itself. The system 100 may come up with a new model or a new version of an existing model and redeploy them to adapt to such learnings.

The illustrated steps are set out to explain the exemplary embodiments shown, and it should be anticipated that ongoing technological development will change the way particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

In view of the above description, the embodiments presented herein enable the controller 114 to analyze each input form a plurality of the models/programs based on specific stochastic and probabilistic models (ensemble of models) for predictive analytics, aggregates those individual model outputs in an aggregator and after correlating them with respect to business objectives using combinatorial analysis, recommends an optimal, cost effective, time bound and executable schedule.

The embodiments presented herein also enable a controller of conversational nature (a smart AI/ML digital assistant) that provides recommendations. Initially, the controller may evaluate the efficiency gains based on the recommendations it provides, and over time may get more stringent with respect to compliance/variance.

5.0 Procedural Overview

Figure 4A:
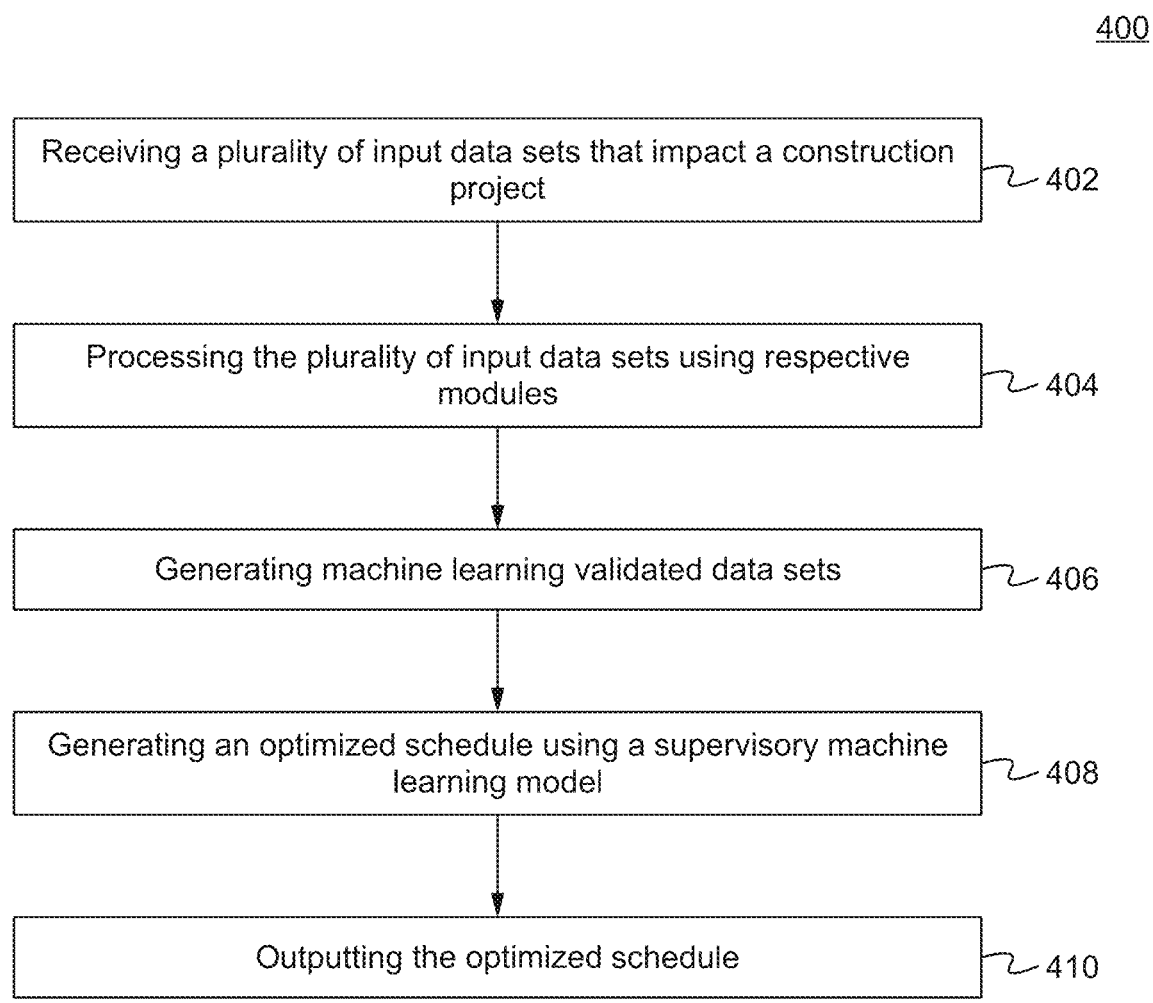
FIG. 4A illustrates an example method of generating a dynamic schedule, according to an embodiment.

FIG. 4A illustrates an example method 400 of generating a dynamic schedule, according to an embodiment. FIG. 4A may be used as a basis to code the method 400 as one or more computer programs or other software elements that a server computer can execute or host.

At step 402, a plurality of input data sets that impact a construction project is received. For example, one or more data feeds of the plurality of data feeds is received at the model ensemble 112 after a schedule request for a construction activity of a construction project is received. The schedule request identifies one or more construction objectives for the construction activity. For example, the schedule request may identify "construct a 50 story building in Midtown Manhattan with XYZ design imprint" and "on time, on budget, meeting quality and health considerations" as the construction objectives (e.g., type of building, location, time frame, budget, quality and health considerations). The schedule request specifies an identifier of a design imprint (e.g., XYZ) for access, which includes architectural information relating to how the building looks like. The architectural information includes tasks associated with the construction of the building. The monitor 118 may access the plurality data feeds from one or more sources and store the plurality of data feeds in the data feed database 132. Each of the plurality of input data feeds is to be processed with the constructive objectives in consideration. Each construction objective may be specified or selected from of a plurality of constructive objectives stored in the CO database 134.

At step 404, the plurality of input data sets is processed. For example, the plurality of data feeds is processed by respective modules of the model ensemble 112. A module may include an ensemble of one or more machine learning models. In an embodiment, each respective module processes only data segments of each data feed that are pertinent to the function objectives of that respective module.

At step 406, first intermediary data sets are generated. For example, the respective modules generate machine learning validated data sets corresponding to each of the plurality of input data sets. In some embodiments, each module of the model ensemble 112 generates the first intermediary data set for each data feed.

At step 408, an optimized schedule for a construction activity is generated using a supervisory machine learning model. For example, the schedule recommender 226 of the controller 114 implements the supervisory machine learning model that generates an optimized schedule for the construction activity to meet a construction objective(s) of the construction project, based on the first intermediary data sets generated by the respective modules of the model ensemble 112. In some embodiments, the first intermediary data sets may be first analyzed and correlated by the analytical aggregator 220 and the correlation analyzer 222 of the controller 114. Output from the correlation analyzer 222 may be further processed by the combinatorial analysis knowledge and semantic graph model 224 to generate second intermediary data set including weighted tasks, for the construction activity. The efficacy metrics analysis module 352, the schedule variance module 356, and the contractor implementation module 354 together dynamically generates the optimized schedule from the weighted tasks. The optimized schedule achieves the construction objectives.

Figure 4B:
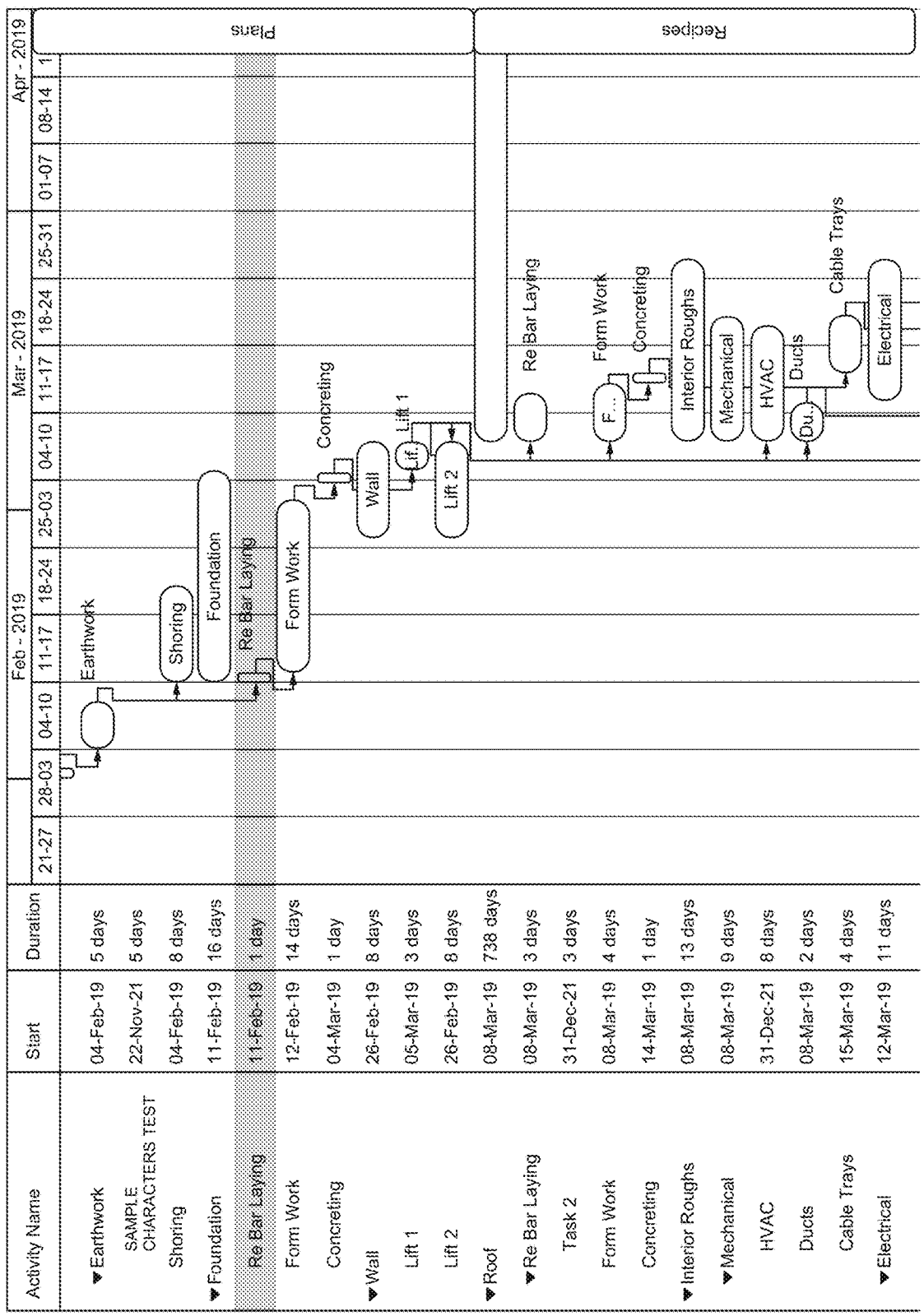
FIG. 4B illustrates an example schedule, according to an embodiment.

At step 410, the optimized schedule is generated in response to the schedule request. The optimized schedule is generated based on the weighted tasks. The optimized schedule is generated also based on the efficacy metrics, whether sequencing of tasks (e.g., recommendations) were followed, and/or schedule variance. The optimized schedule is caused to be output at a client device (visually and/or auditorily). An example schedule is illustrated in FIG. 4B.

A schedule may be interactively rendered on a graphical user interface, such as in a browser or a client application. The example schedule of FIG. 4B shows different construction activities, such as Foundation, Wall, Roof, etc. Each construction activity includes one or more tasks, each task including a start data and a duration time. The construction activities are listed as a sequence of events. The example schedule also includes a graphical timeline showing tasks to be completed for each activity. Details of each tasks may be shown, such as in an overlay, by activating the task in the timeline (e.g., mouse-over, double-clicking, etc.). Details may include information relating to recommended contractors and suppliers.

In an embodiment, feedback for the schedule may be received at the monitor 118 to modify one or more subcomponents of the controller 114, such as the aggregator 220 of the controller 114. An updated or further optimized schedule may be generated. The controller 114 and the monitor 118 implement an ensemble of closed loop efficacy analysis machine learning models.

The disclosed techniques advantageously adapt and make decisions in real time to account for dynamic nature of a construction project. The techniques may be performed by processing logic that may include hardware (circuitry, dedicated logic, etc.), software (such as run on a general-purpose computer system or a dedicated machine), or a combination of both. The processing logic may be included in any node or device (e.g., core node, CPEs, controller etc.), or any other computing system or device. A person with ordinary skill in the art will appreciate that the disclosed method is capable of being stored on an article of manufacture, such as a non-transitory computer-readable medium. In an embodiment, the article of manufacture may encompass a computer program accessible from a storage media or any computer-readable device.

6.0 Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
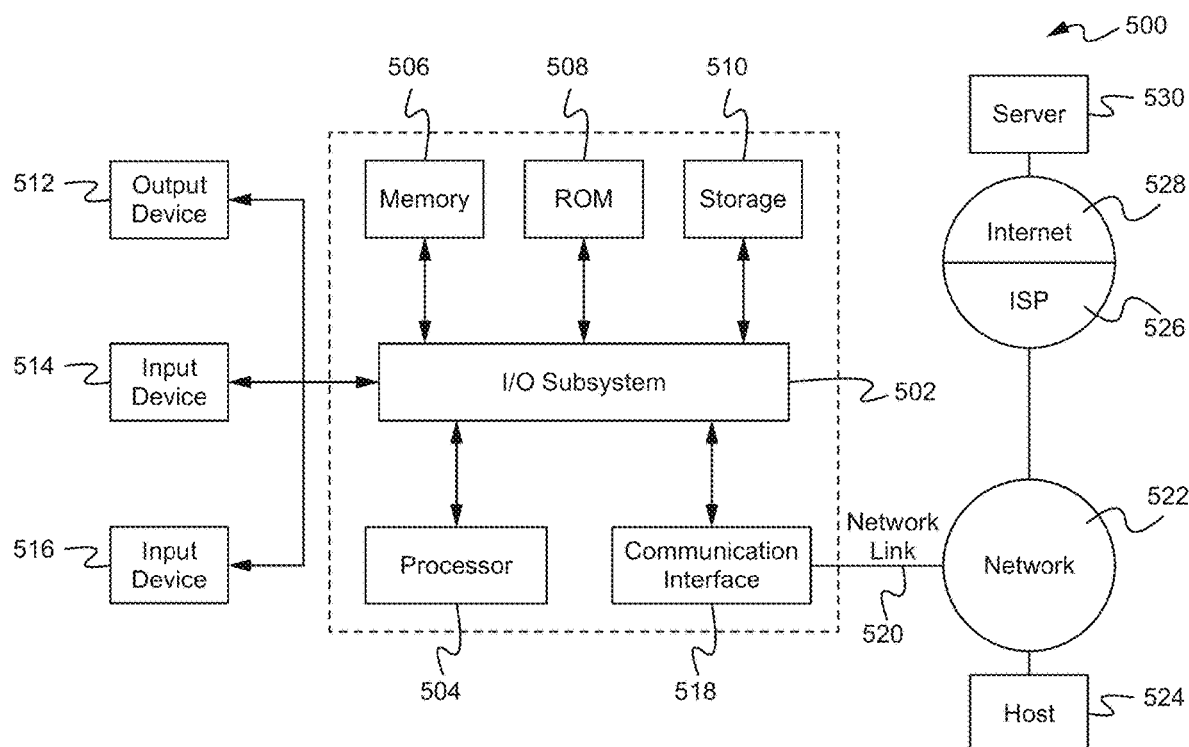
FIG. 5 illustrates a block diagram of a computing device in which the example embodiment(s) of the present invention may be embodiment.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage devices coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk, or optical disk such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In an embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators, or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on a display. The control device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device.

An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as by placing the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to the bus on I/O subsystem 502. Communication interface 518 provides two-way data communication coupling to network link(s) 520 that are directly or indirectly connected to at least one communication network, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork, or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic, or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 to other computing devices via internetworking devices and/or computers that are operated by an Internet Service Provider (ISP) 526. ISP 526 provides data communication services through a world-wide packet data communication network represented as internet 528. Server computer 530 may be coupled to internet 528. Server 530 broadly represents any computer, data center, virtual machine, or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed and consisting of program code and its current activity. Depending on the operating system (OS), a process may be composed of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7.0 Software Overview

Figure 6:
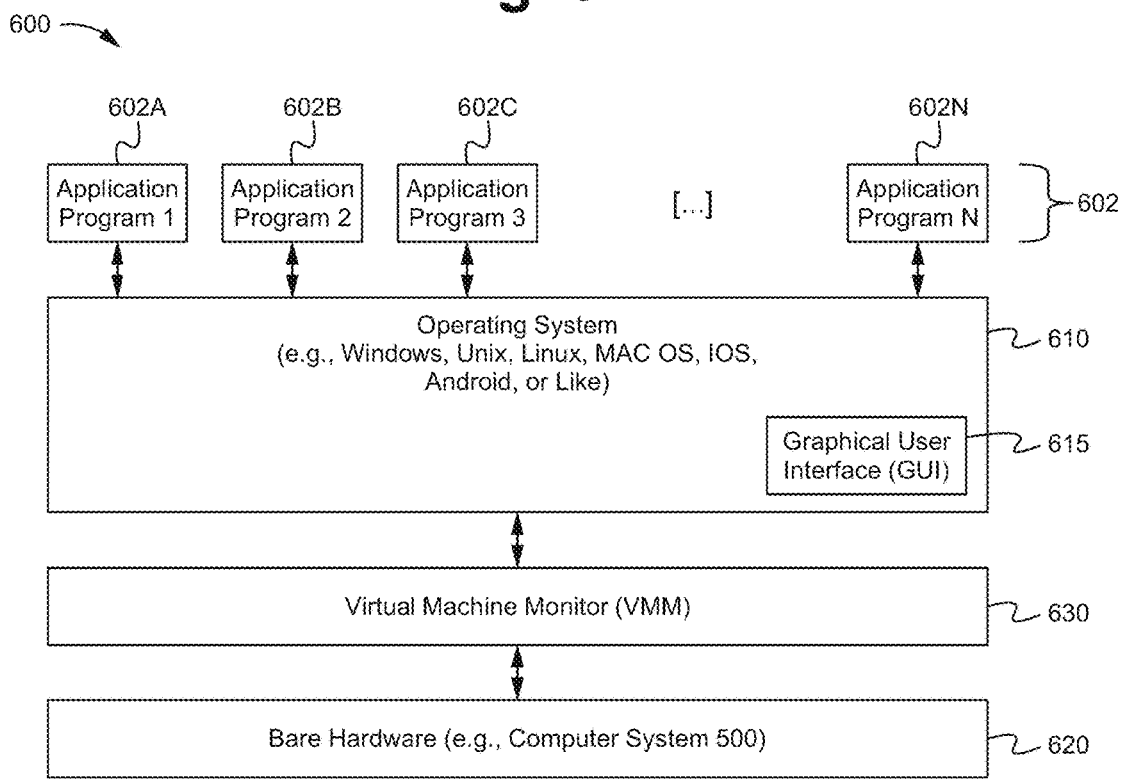
FIG. 6 illustrates a block diagram of a basic software system for controlling the operation of a computing device in accordance with an embodiment.

FIG. 6 is a block diagram of a basic software system 600 that may be employed for controlling the operation of computing device 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing device 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N (collectively, application(s) 602), may be "loaded" (e.g., transferred from fixed storage 510 into memory 506) for execution by the system 600. The applications or other software intended for use on device 600 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of device 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the device 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running directly on the bare hardware 620 of device 500. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

8.0 Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A computer-implemented method, comprising: receiving, by a server device, a schedule request for a construction activity of a construction project from a client device, the schedule request identifying at least one construction objective; accessing, by the server device, a plurality of input data sets, wherein the plurality of input data sets includes data sets from a data feed database comprising a plurality of data feeds from various sources, and wherein each data feed includes data segments comprising metadata indicating a data type, and wherein the plurality of input data sets includes at least one camera feed, wherein the at least one camera feed includes metadata or tags identifying all segments of the at least one camera feed; training a plurality of ensembles of neural network machine learning models using new training data, including data relating to the construction project; applying, by the server device, the trained plurality of ensembles of neural network machine learning models to each of the plurality of input data sets to generate a plurality of intermediary data sets that each identifies factors that impact the construction project, wherein each trained ensemble of the neural network machine learning models of the trained plurality of ensembles of the neural network machine learning models generates an intermediary data set, according to function objectives of a respective ensemble of the neural network machine learning models, from particular segments of all segments that are associated with the function objectives of the respective ensemble of the neural network machine learning models; determining, by the server device and based on the plurality of intermediary data sets, task data using at least one knowledge and semantic graph model, wherein an analytical aggregator uses a correlation analyzer to correlate various outputs of each ensemble of the neural network machine learning models to generate the at least one knowledge and semantic graph model; generating, by the server device and from the task data, a schedule for the construction activity, the schedule achieving the at least one construction objective and satisfying tolerance levels associated with a baseline schedule; and notifying, by the server device, the schedule based on the at least one construction objective identified from the schedule request.

2. The computer-implemented method of claim 1, further comprising: applying a stochastic model to the plurality of intermediary data sets to determine correlation data of the factors that impact the construction project;

and applying the at least one knowledge and semantic graph model to the correlation data and tenant data to generate the task data.

3. The computer-implemented method of claim 2, further comprising: receiving feedback data pertaining to issues related to the construction project; using the feedback data to modify the stochastic model; and updating the schedule for the construction project.

4. The computer-implemented method of claim 3, wherein receiving the feedback data comprises: receiving a live camera feed from a construction site; determining efficiency issue data relating to the construction project from the live camera feed; and generating the feedback data from the efficiency issue data.

5. The computer-implemented method of claim 3, wherein the feedback data is received as user input via a graphical user interface.

6. The computer-implemented method of claim 1, wherein generating the schedule comprises: determining variance data between actual construction and expected construction based on the schedule; and using the variance data to refine the schedule.

7. The computer-implemented method of claim 1, wherein the schedule is indicated via at least one of a graphical user interface, voice, and messaging.

8. The computer-implemented method of claim 1, wherein the trained plurality of ensembles of neural network machine learning models includes at least one of: a climate analysis module configured to analyze weather patterns from at least one input data set of the plurality of input data sets, a structural analysis module configured to analyze quality and design from at least one input data set of the plurality of input data sets, a quality analysis module configured to analyze progress from at least one input data set of the plurality of input data sets, an inventory analysis module configured to analyze inventory from at least one input data set of the plurality of input data sets, a regulatory module configured to analyze completion timeliness, based on requirements, from at least one input data set of the plurality of input data sets, a global event impact module configured to analyze global events from at least one input data set of the plurality of input data sets, a supply chain analysis module configured to analyze supply and delivery from at least one input data set of the plurality of input data sets, an equipment health and Internet-of-Things (IoT) metric analysis module configured to analyze equipment needs and procurement factors from at least one input data set of the plurality of input data sets, and a labor efficiency module configured to analyze labor availability and skills from at least one input data set of the plurality of input data sets.

9. One or more non-transitory computer-readable storage media storing one or more instructions programmed which, when executed by one or more computing devices, cause: receiving, by a server device, a schedule request for a construction activity for a construction project from a client device, the schedule request identifying at least one construction objective; accessing, by the server device, a plurality of input data sets, wherein the plurality of input data sets includes data sets from a data feed database comprising a plurality of data feeds from various sources, and wherein each data feed includes data segments comprising metadata indicating a data type, and wherein the plurality of input data sets includes at least one camera feed, wherein the at least one camera feed includes metadata or tags identifying all segments of the at least one camera feed; training a plurality of ensembles of neural network machine learning models using new training data, including data relating to the construction project; applying, by the server device, the trained plurality of ensembles of neural network machine learning models to each of the plurality of input data sets to generate a plurality of intermediary data sets that each identifies factors that impact the construction project, wherein each trained ensemble of the neural network machine learning models of the trained plurality of ensembles of the neural network machine learning models generates an intermediary data set, according to function objectives of a respective ensemble of the neural network machine learning models, from particular segments of all segments that are associated with the function objectives of the respective ensemble of the neural network machine learning models; determining, by the server device and based on the plurality of intermediary data sets, task data using at least one knowledge and semantic graph model, wherein an analytical aggregator uses a correlation analyzer to correlate various outputs of each ensemble of the neural network machine learning models to generate the at least one knowledge and semantic graph model; generating, by the server device and from the task data, a schedule for the construction activity, the schedule achieving the at least one construction objective and satisfying tolerance levels associated with a baseline schedule; and notifying, by the server device, the schedule based on the at least one construction objective identified from the schedule request.

10. The one or more non-transitory computer-readable storage media of claim 9, wherein the one or more instructions programmed which, when executed by the one or more computing devices, further cause: applying a stochastic model to the plurality of intermediary data sets to determine correlation data of the factors that impact the construction project; and applying the at least one knowledge and semantic graph model to the correlation data and tenant data to generate the task data.

11. The one or more non-transitory computer-readable storage media of claim 10, wherein the one or more instructions programmed which, when executed by the one or more computing devices, further cause: receiving feedback data pertaining to issues related to the construction project; using the feedback data to modify the stochastic model; and updating the schedule for the construction project.

12. The one or more non-transitory computer-readable storage media of claim 11, wherein receiving the feedback data comprises: receiving a live camera feed from a construction site; determining efficiency issue data relating to the construction project from the live camera feed; and generating the feedback data from the efficiency issue data.

13. The one or more non-transitory computer-readable storage media of claim 11, wherein the feedback data is received as user input via a graphical user interface.

14. The one or more non-transitory computer-readable storage media of claim 9, wherein generating the schedule comprises: determining variance data between actual construction and expected construction based on the schedule; and using the variance data to refine the schedule.

15. The one or more non-transitory computer-readable storage media of claim 9, wherein the schedule is indicated via at least one of a graphical user interface, voice, or messaging.

16. A computing system, comprising: one or more computer systems comprising one or more hardware processors and storage media; instructions stored in the storage media and which, when executed by the computing system, cause the computing system to perform: receiving, by a server device, a schedule request for a construction activity of a construction project from a client device, the schedule request identifying at least one construction objective; accessing, by the server device, a plurality of input data sets, wherein the plurality of input data sets includes data sets from a data feed database comprising a plurality of data feeds from various sources, and wherein each data feed includes data segments comprising metadata indicating a data type, and wherein the plurality of input data sets includes at least one camera feed, wherein the at least one camera feed includes metadata or tags identifying all segments of the at least one camera feed; training a plurality of ensembles of neural network machine learning models using new training data, including data relating to the construction project; applying, by the server device, the trained plurality of ensembles of neural network machine learning models to each of the plurality of input data sets to generate a plurality of intermediary data sets that each identifies factors that impact the construction project, wherein each trained ensemble of the neural network machine learning models of the trained plurality of ensembles of the neural network machine learning models generates an intermediary data set, according to function objectives of a respective ensemble of the neural network machine learning models, from particular segments of all segments that are associated with the function objectives of the respective ensemble of the neural network machine learning models; determining, by the server device and based on the plurality of intermediary data sets, task data using at least one knowledge and semantic graph model, wherein an analytical aggregator uses a correlation analyzer to correlate various outputs of each ensemble of the neural network machine learning models to generate the at least one knowledge and semantic graph model; generating, by the server device and from the task data, a schedule for the construction activity, the schedule achieving the at least one construction objective and satisfying tolerance levels associated with a baseline schedule; and notifying, by the server device, the schedule based on the at least one construction objective identified from the schedule request.

17. The computing system of claim 16, wherein the instructions, when executed by the computing system, cause the computing system to further perform: applying a stochastic model to the plurality of intermediary data sets to determine correlation data of the factors that impact the construction project; and applying the at least one knowledge and semantic graph model to the correlation data and tenant data to generate the task data.

18. The computing system of claim 17, wherein the instructions, when executed by the computing system, cause the computing system to further perform: receiving feedback data pertaining to issues related to the construction project; using the feedback data to modify the stochastic model; and updating the schedule for the construction project.

19. The computing system of claim 18, wherein receiving the feedback data comprises: receiving a live camera feed from a construction site; determining efficiency issue data relating to the construction project from the live camera feed; and generating the feedback data from the efficiency issue data.

20. The computer system of claim 16, wherein generating the schedule comprises: determining variance data between actual construction and expected construction based on the schedule; and using the variance data to refine the schedule.

* * * * *

UNITED STATES PATENT AND TRADEMARK OFFICE
CERTIFICATE OF CORRECTION

| | |
|---|---|
| PATENT NO. | : 11,531,943 B1 |
| APPLICATION NO. | : 17/683858 |
| DATED | : December 20, 2022 |
| INVENTOR(S) | : Senthil Manickavasgam Kumar |

It is certified that error appears in the above-identified patent and that said Letters Patent is hereby corrected as shown below:

In the Claims

In Claim 1, at Column 29, Line 7, please insert --correlation data that is used as input to-- between "generate" and "the at least one".

In Claim 9, at Column 30, Line 38, please insert --correlation data that is used as input to-- between "generate" and "the at least one".

In Claim 16, at Column 32, Line 9, please insert --correlation data that is used as input to-- between "generate" and "the at least one".

Signed and Sealed this
Seventh Day of March, 2023

Katherine Kelly Vidal
*Director of the United States Patent and Trademark Office*